United States Patent
Rossi

(10) Patent No.: US 6,965,771 B2
(45) Date of Patent: Nov. 15, 2005

(54) METHOD FOR SELECTING APPLICATIONS THAT CAN BE ACTIVATED VIA A CIVIL AERONAUTICAL COMMUNICATION NETWORK

(75) Inventor: Nicolas Rossi, Sevres (FR)

(73) Assignee: Thales, Paris (FR)

( * ) Notice: Subject to any disclaimer, the term of this patent is extended or adjusted under 35 U.S.C. 154(b) by 445 days.

(21) Appl. No.: 10/221,181

(22) PCT Filed: Jan. 22, 2002

(86) PCT No.: PCT/FR02/00256

§ 371 (c)(1),
(2), (4) Date: Sep. 20, 2002

(87) PCT Pub. No.: WO02/060155

PCT Pub. Date: Aug. 1, 2002

(65) Prior Publication Data

US 2003/0139135 A1 Jul. 24, 2003

(30) Foreign Application Priority Data

Jan. 23, 2001 (FR) .................................... 01 00877

(51) Int. Cl.⁷ ............................................. H04Q 7/20

(52) U.S. Cl. ...................... 455/431; 455/430; 455/410; 701/3; 340/945

(58) Field of Search ............................. 455/427, 428, 455/430, 429, 431, 410; 701/3, 120; 340/945; 342/36

(56) References Cited

U.S. PATENT DOCUMENTS

| 5,714,783 A | * | 2/1998 | Duvvury ..................... 257/355 |
| 6,185,430 B1 | * | 2/2001 | Yee et al. .................... 455/519 |
| 6,353,779 B1 | * | 3/2002 | Simon et al. .................. 701/3 |
| 2002/0007234 A1 | * | 1/2002 | Heppe et al. ................. 701/10 |
| 2002/0155833 A1 | * | 10/2002 | Borel .......................... 455/431 |

FOREIGN PATENT DOCUMENTS

| EP | 1 022 876 | 7/2000 |
| FR | 2 778 046 | 10/1999 |

OTHER PUBLICATIONS

T.L. Signore: "A simplified aeronautical telecommunication network (ATN) avionics architecture" 17th Dasc. The AIAA/IEEE/SAE Digital Avionics Systems Conference Proceedings, vol. 2, pp. F-15-1-F15-5 1998.

* cited by examiner

*Primary Examiner*—Tilahun Gesesse
(74) *Attorney, Agent, or Firm*—Oblon, Spivak, McClelland, Maier & Neustadt, P.C.

(57) ABSTRACT

It is proposed, for better efficacity of the ATN aeronautical telecommunication network, that the requests for logons through the ATN network originating from non-ATC applications be subjected to a validation of the addresses requested by means of two availability tables kept up-to-date and placed in the terminal hosting the applications asking for logons. One of the tables relates to the availability of the local applications and serves to advise the remote terminals. The other table relates to the availability of the remote applications and serves for the validation of the logon requests emanating from the local applications.

11 Claims, 3 Drawing Sheets

Figure 1:
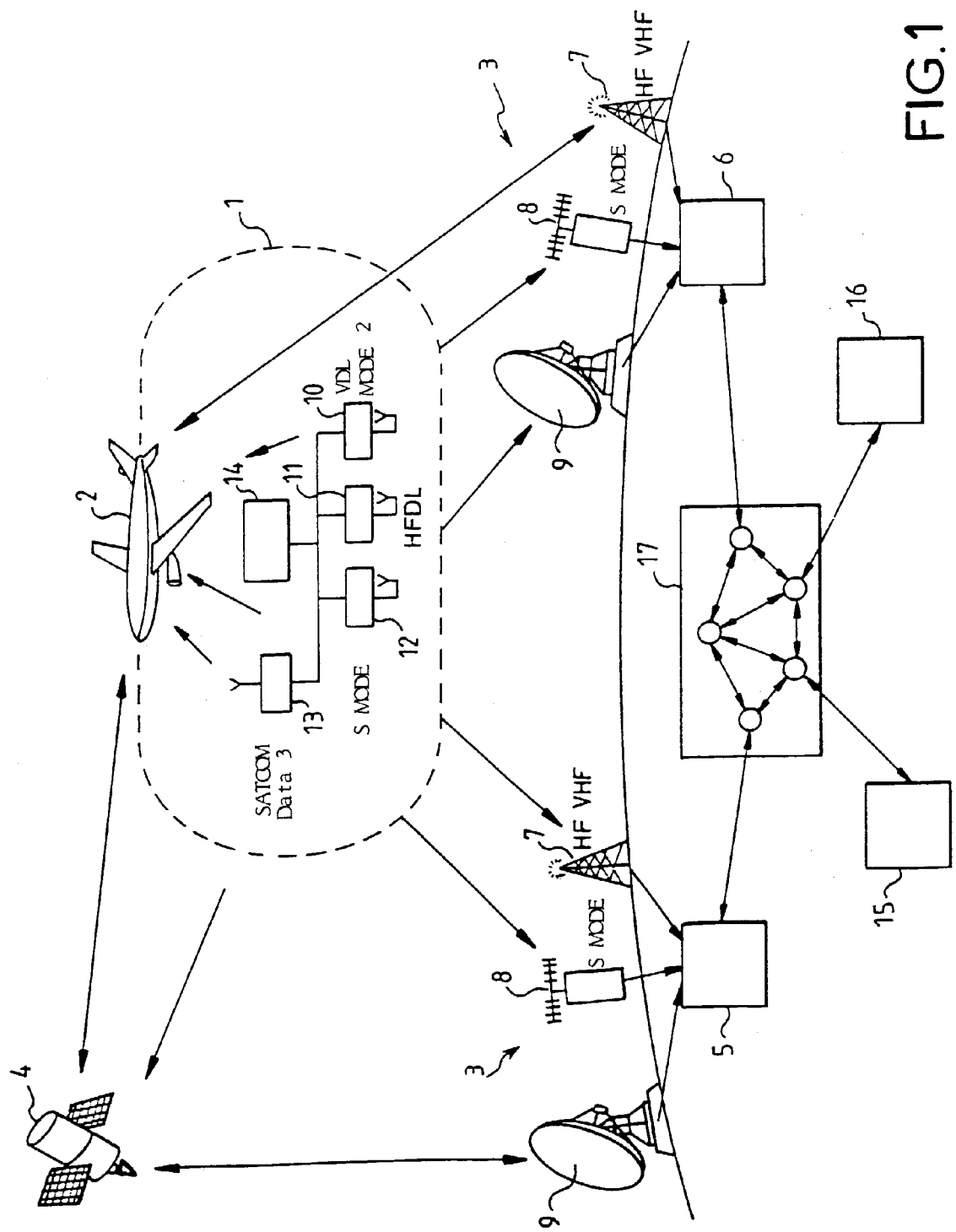

METHOD FOR SELECTING APPLICATIONS THAT CAN BE ACTIVATED VIA A CIVIL AERONAUTICAL COMMUNICATION NETWORK

The present invention relates to the management of communications, other than those dedicated to air traffic control, exchanged between an aircraft and the ground.

The densification of air traffic, the continual desire to maintain and even enhance safety as well as the desire to improve the management of a flight are leading to an ever greater demand for information exchanges between an aircraft, whether it be in-flight or on the ground, and ground centers. This demand which is further boosted by a rapid increase in the information processing capabilities of equipment stowed on board an aircraft is slowed by the limited information carrying capability of the radio communication network currently used between civil aircraft and the ground. To remove this bottleneck, the International Civil Aviation Organization has scheduled the deployment of a new and much more powerful civil aeronautical communication network termed "ATN" (the initials standing for: "Aeronautical Telecommunication Network"), the main outline of which it has defined through restrictive documents termed "recommendations".

The ATN aeronautical telecommunication network, which is progressively being put in place on the surface of the globe, is a general-purpose digital data transmission network dedicated to the carriage of all the information which aircraft are liable to exchange with the ground in the near future. Within this information, it is customary to distinguish between that stemming from the air control activity termed "ATC" (the initials standing for: "Air Traffic Control") and for which transmission is subject to a requirement for very high reliability, and the other information termed "non-ATC" such as, for example, that termed AAC (the initials standing for: "Aeronautical Administrative Communications") stemming from commercial flight operation, such as the list of passengers for the flight, the list of provisions for the passengers and for the crew, and the list of duty-free sales offered on board, etc., that termed AOC (the initials standing for: "Airline Operation Control") stemming from the technical operation of the aircraft, such as the aircraft's consumption and various items of information regarding maintenance and that termed APC (the initials standing for: "Aeronautical Public Correspondence") stemming from the convenience of the passengers, such as telephone, passenger information, etc., and for which the reliability of transmission is less critical.

The ICAO recommendations fix, in a restrictive manner, the details of the procedure for managing communications through the ATN aeronautical telecommunication network, essentially, the addressing, setting up, maintaining and completion of a communication, and the so-called "ATC" applications fulfilling tasks involving exchanges of information of ATC type through the ATN aeronautical network. On the other hand, they are not concerned with the other so-called "non-ATC" applications fulfilling tasks not involving exchanges of information of ATC type through the ATN aeronautical telecommunication network. These non-ATC applications are left to the initiative of each party, the only restriction being compliance with the communications management procedure prescribed for the setting up, maintaining and completion of a communication through the ATN aeronautical telecommunication network.

The non-ATC applications are therefore developed by the parties, in practice the airline companies, according to their own needs without any desire for uniformization, other than that of compliance with the prescribed procedure for managing communications within the ATN aeronautical telecommunication network. Moreover, reliability being less critical than in the case of ATC applications, the non-ATC applications are not developed with the same rigor, in particular methodological, as the ATC applications, this also acting counter to their uniformization.

At the present time, the messages of the non-ATC applications are transmitted on the ATN aeronautical network with no prior coordination between the aircraft (on board) and the ground. An "on-board" application, that is to say one managed from on board an aircraft, can transmit messages by way of the aeronautical telecommunication network, destined for the ground, either spontaneously, or an interrogation from the ground. Regardless of the chosen mode of operation, there is no coordination and the messages are transmitted blind without knowing whether the destination of the message is available, proper reception being noted through the request for an acknowledgement of receipt or through the execution of the requested task. Since an application banks on the availability of its counterpart, this lack of coordination may cause an application to multiply the fruitless endeavors to transmit, at least as many times as the number allowed in order to decree the presence of a problem in transmission, although any attempt to transmit was doomed to failure from the outset owing to an absence of the sought-after destination, for example, through the fact that the aircraft or the ground center interrogated never did have or momentarily no longer has the desired application. Specifically, the degrees of equipment of aircraft are very diverse and the interrogated ground centers may be victim to scheduled or unscheduled transient unavailabilities of certain of their applications. These abortive call attempts needlessly occupy the air/ground communication resources of the ATN aeronautical telecommunication network and may turn out to be expensive for the parties, the aeronautical telecommunication network being billed not only for the amount of data actually transmitted but also for each logon request.

The aim of the present invention is to limit the expenses related to the use of the aeronautical telecommunication network and the loading of this network whose capacities will never be unlimited, while preventing the non-ATC applications from attempting logons through the aeronautical telecommunication network which are doomed to failure from the outset, owing to the temporary or permanent inability of the destination to execute the requested task since it does not have, temporarily or permanently, the appropriate application.

Its subject is a method of selecting applications which can be activated through an aeronautical telecommunication network, noteworthy in that it consists in providing the terminal for linking to the aeronautical telecommunication network of a party to non-ATC applications:

with two tables of availability of applications, one local cataloging the applications available locally, at the level of the linking terminal of the party and the other remote cataloging the applications available at the level of the linking terminals of one or more privileged counterparts picked either because they are preselected, or because the party has already attempted beforehand to get in touch with them through the aeronautical telecommunication network, with the means of consulting the local availability table, which means are activated by request of a remote linking terminal, with the means of consulting the remote availability table, which means are activated, with each attempt made by an application to logon through the aeronautical telecommunication network and which, either authorizes logon if the remote counterpart requested is cataloged in the remote availability table for the relevant application, or denies it if the remote counterpart requested does not feature in the remote availability table for the relevant application, with the means of remote interrogation of the local availability tables of the counterparts contactable through the aeronautical telecommunication network, with the means of updating the local availability table of the party operating by monitoring the availability of the applications possessed by the party, and with the means of updating the remote availability table operating by at least partial copying of the local availability tables of the counterparts by activating the means of remote interrogation.

Advantageously, the local availability table is reinitialized upon switching on the relevant linking terminal.

Advantageously, the updating of the local availability table is effected as a function of the dysfunction alarms and of the nonavailability notices generated by the non-ATC local applications.

Advantageously, the updating of the local availability table is effected in a systematic and periodic manner.

Advantageously, the remote availability table is reinitialized upon switching on the relevant linking terminal, with a content obtained by remote copying of the contents of the local availability tables of previously listed remote terminals for linking to the aeronautical telecommunication network.

Advantageously, the remote availability table is reinitialized upon switching on the relevant terminal, with a default content which reflects the theoretical availabilities of non-ATC remote applications of previously listed remote terminals and which is updated by interrogating the remote terminals utilized as to the differences between the actual and theoretical contents of their local availability tables.

Advantageously, the means of consulting the local availability table are sensitive to at least two types of inquiries on the part of a remote terminal, a general inquiry regarding the global content of their local availability table and a particular inquiry regarding the differences between the actual contents of their local availability table and those which are theoretical or previously notified.

Advantageously, the remote availability table is reinitialized upon switching on the relevant terminal, by remote copying of the contents of the local availability tables of a preset list of remote terminals and updating by periodically interrogating the remote terminals as to the contents of their local availability tables.

Advantageously, a terminal for linking to the aeronautical telecommunication network, in the presence of a change of state of availability of one of its non-ATC applications, warns all the remote linking terminals referenced in its remote availability table of this change of state of availability so as to harmonize their remote availability tables.

Advantageously, when the terminal for linking to the aeronautical telecommunication network includes a microprocessor-based automaton catering for the management of the communications under the control of various specialized software modules called as a function of the nature of the task to be performed: CMA software module for the initializing, maintaining and completion of an application communication, SN-SME software module for the maintaining and completion of a logon within the aeronautical telecommunication network, IRDP software module for the routing of a communication, ATC Applis software module for the execution of preloaded ATC applications and non-ATC Applis software modules for the execution of preloaded non-ATC applications, the means of consulting the remote availability table and of updating the local and remote availability tables consist of said microprocessor-based automaton operating under the control of a specific software module for validating a call, which manages the means of consulting and updating the local and remote availability tables, intercepts the requests for logon of the non-ATC local applications and verifies the availability of their counterpart before authorizing a continuance of their processing.

Advantageously, the software module for validating the calls monitors the freshness of the information items contained in the local and remote availability tables and undertakes their updating as soon as they reach an arbitrarily fixed expiry date.

Figure 2:
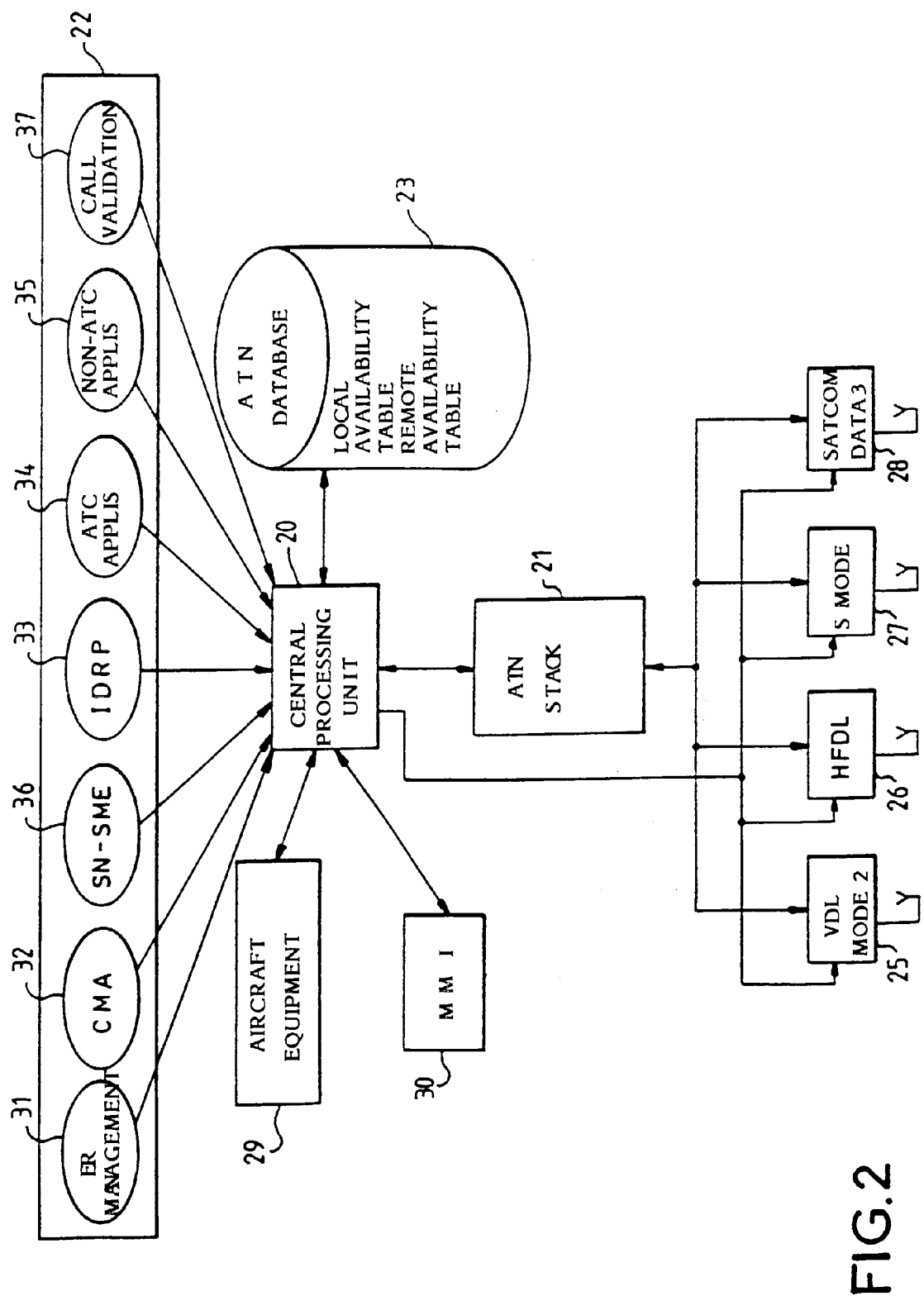
Figure 3:
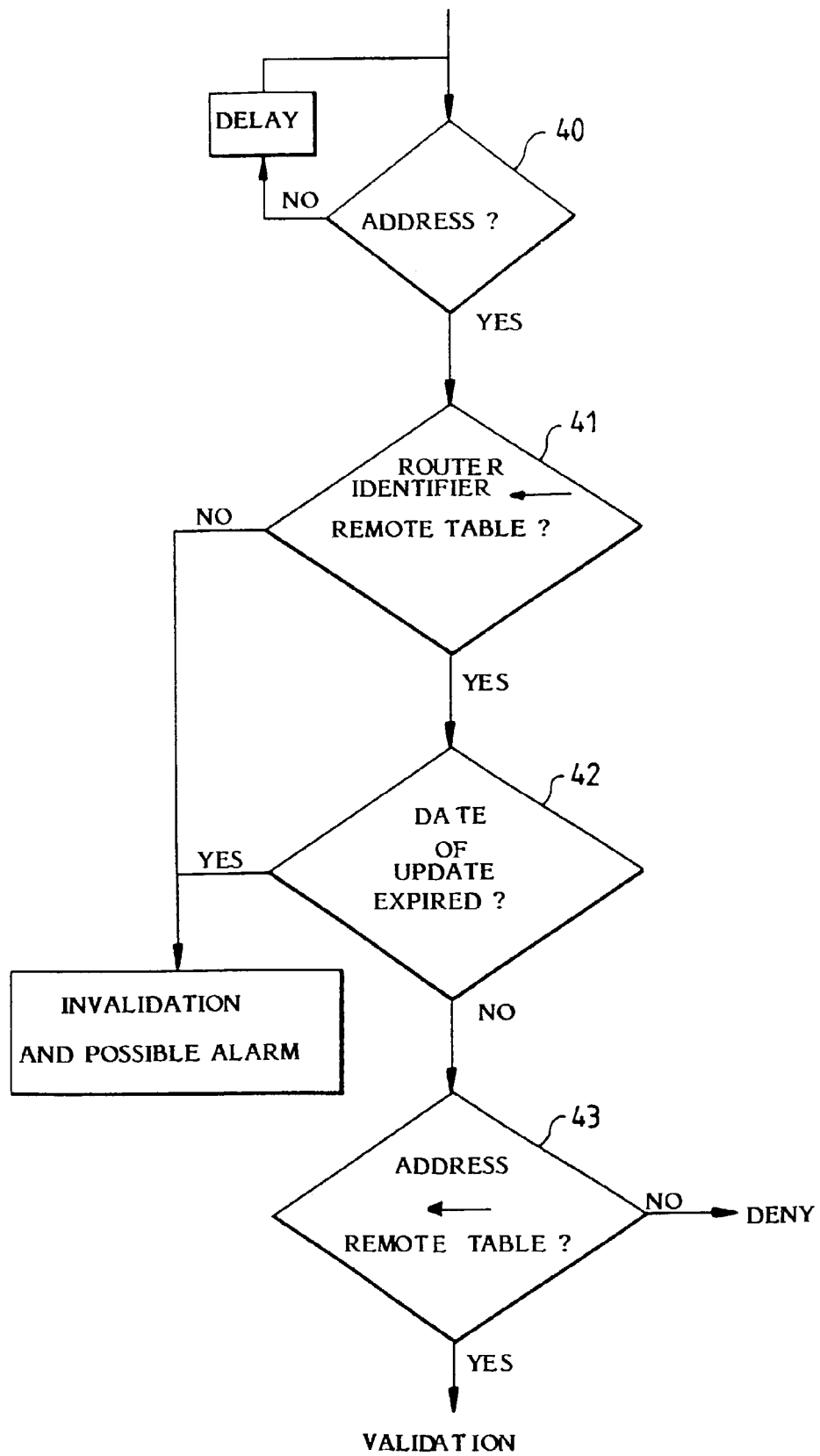

Other characteristics and advantages of the invention will emerge from the description below of an embodiment given by way of example. This description will be given with regard to the drawing in which:

a FIG. 1 diagrammatically shows the ATN aeronautical telecommunication network, a FIG. 2 diagrammatically shows a first exemplary ATN aeronautical telecommunication network on-board router implementing the invention, and a FIG. 3 represents, in the form of a flowchart, an exemplary procedure for validating a call address.

The aeronautical telecommunication network ATN aims to provide reliable and high-throughput digital ground-air links for information exchange between aircraft on the ground or in flight and ground centers, whether these centers are assigned to air-traffic control activity, the information exchanged with the air-traffic control authorities being called ATC information, or to an activity operating the aircraft flight, the information exchanged with the company or companies operating the aircraft being termed non-ATC information, the distinction between the two types of information being justified by different transmission constraints in terms of security and reliability.

Like any digital link, the ATN aeronautical telecommunication network allows information exchanges or dialogues between two tasks or applications run by remote processors, in general a processor placed on board an aircraft and a processor placed on the ground. The applications which can talk to one another by dialogue via the ATN aeronautical telecommunication network are termed ATC or non-ATC depending on whether the nature of the information which they exchange is ATC or non-ATC.

The ATN aeronautical telecommunication network is designed to use the various media which can be envisioned for air-ground links (HF, VHF, S-mode radar, UHF by satellite) and to use, on the ground, specialized or nonspecialized data transmission networks, switched or otherwise, by cable or radio waves, relayed by satellite or otherwise, so as to have the information transmitted arrive at its destination.

As represented in FIG. 1, the aeronautical telecommunication network ATN includes an airside part 1 on board each aircraft 2 connected and a terrestrial part 3.

The airside part 1 is made up of various pieces of transmitter/receiver equipment installed on an aircraft 2 and suitable for the various media which can be used for the air-ground communications. This transmitter/receiver equipment and its counterparts on the ground constitute transmission sub-networks. In FIG. 1 an aircraft 2 is represented with an airside aeronautical transmission network ATN part 1 including several transmitters/receivers including a transmitter/receiver 10 constituting a VDL mode 2 transmission sub-network head end operating in VHF according to a standardized specific protocol, a transmitter/receiver 11 constituting an HFDL-mode transmission sub-network head end operating in HF according to another standardized specific protocol, a transmitter/receiver 12 constituting an S-mode transmission sub-network head end operating at UHF in collaboration with a secondary radar according to another, likewise standardized, protocol, and a transmitter/receiver 13 constituting an AMSS (abbreviation for "Aeronautical Mobile Satellite System") Satcom-data-mode communication sub-network head end 3 operating at UHF with a satellite relay 4, according to yet another standardized protocol. These various transmitters/receivers 10, 11, 12, 13 may feature common parts, such that the various sub-networks may not all be available simultaneously. They may not even be present in full on an aircraft, this depending on the degree of equipment fit on the aircraft in question. They are managed on board an aircraft by an automaton 14 called a router which, in addition to managing them, undertakes, by manipulating a memory stack in which transit the data to be exchanged with the ground, the initialization, the maintenance and the completion of a communication under the control of a software module called CMA (abbreviation of the expression "Context Management Agent"), the routing of a communication under the control of a software module called IDRP (abbreviation of "Inter Domain Routing Policy"), the running of preloaded applications for air-traffic control such as the periodic communication of the position of the aircraft to the ground control under the control of a software module called "ATC Applis", and the running of preloaded fleet-management applications such as the monitoring of the consumption by the aircraft under the control of a software module called "non-ATC Applis".

The terrestrial part of the ATN aeronautical telecommunication network consists of routing ground stations 5,6. These routing ground stations 5,6 are equipped with ground-air communication means, HF-VHF transmitters/receivers 7, S-mode radar 8, satellite communication ground station 9, allowing them to communicate with the aircraft passing in the vicinity according to one or more communication modes provided for: Satcom Data 3 sub-network, VDL mode 2 sub-network, Mode S sub-network or HFDL-mode sub-network, and linked together and to various ground centers 15, 16 interested in the information exchange involved with the aircraft, via specialized or nonspecialized digital data-transmission networks, switched or otherwise, using cable or radio waves relayed by satellite or otherwise.

At the present time, non-ATC applications are not regulated and are developed by the various parties, in practice the airline companies, depending on their own needs, without any desire for uniformization, other than that of compliance with the prescribed procedure for managing communications within the ATN aeronautical telecommunication network. Their logon requests are transmitted over the ATN aeronautical network with no prior coordination between an aircraft (on board) and the ground.

A non-ATC "on-board" application, that is to say one managed from on board an aircraft, can transmit messages by way of the aeronautical telecommunication network, destined for the ground, either spontaneously, or on interrogation from the ground. Regardless of the chosen mode of operation, there is no coordination and the messages are transmitted blind without knowing whether the destination of the message is available, proper reception being noted through the request for an acknowledgement of receipt or through the execution of the requested task. Since a non-ATC application banks on the availability of its counterpart, this lack of coordination may cause an application to multiply the fruitless endeavors to transmit, at least as many times as the number allowed in order to decree the presence of a problem in transmission, although any attempt to transmit was doomed to failure from the outset owing to an absence of the sought-after destination, for example, through the fact that the aircraft or the ground center interrogated never did have or momentarily no longer has the desired application. Specifically, the degrees of equipment of aircraft are very diverse and the interrogated ground centers may be victim to scheduled or unscheduled transient unavailabilities of certain of their applications.

For better efficiency of the ATN aeronautical telecommunication network, it is important to limit fruitless requests for logon as far as possible. The user is encouraged therein through the mode of billing which is based not only on the amount of information transmitted but also on a flat-rate handling charge with each logon request. It is therefore important for a user to limit fruitless requests for logon as far as possible.

With this aim, it is proposed that an ATN aeronautical telecommunication network router be equipped with a mechanism for validating the logon requests operating by means of the router's own database, cataloging the non-ATC applications available locally and the non-ATC applications available remotely, at the level of the linking terminals of one or more privileged counterparts picked either because they are preselected, or because the relevant party has already attempted beforehand to get in touch with them through the aeronautical telecommunication network, and with means for keeping this database up to date.

FIG. 2 schematically illustrates an exemplary hardware and software architecture for an ATN aeronautical telecommunication network on-board router making it possible to improve the proportion of logon requests which succeed through the use of such a validation mechanism.

This router consists, as usual, of a specialized computer with a central processing unit 20, a memory, and various input/output interfaces.

The memory includes various parts, principally including:
- a part 21, called ATN stack, with registers the manipulation of which by the central processing unit 20 allows application of the transmission protocols of the ATN network both in order to generate the data stream sent from on board to the ground from information to be transmitted and from service information used for the establishing, maintaining and conclusion of a link within the ATN network, as well as for the extraction of information contained in the data stream received from the ground in the course of a link and for redirecting it to the on-board equipment involved,
- a part 22 used for storage of various program modules, and
- a part 23 used for storage of a database on the ATN network.

The input/output interfaces link the on-board router with various pieces of equipment of the aircraft, which are essentially:
- the transmitter/receiver systems 25, 26, 27, 28 of the aircraft, capable of acting as air-ground communication sub-network head ends for the ATN network,
- the equipment 29 of the aircraft capable of being made to use the ATN network in order to exchange information with the ground, and at least one man-machine interface MMI 30 such as, for example, the MCDU ("Multipurpose Control Display Unit"), allowing a dialogue between the on-board router and the crew of the aircraft so that the latter can give instructions to the router and extract sundry information from it on the status of the links established via the ATN network.

Among the program modules stored in the part 22 of the memory of the router and executed in time-sharing mode by its central processing unit 20 are conventionally:

a software module 31 for management and distribution of tasks managing the activities of the various on-board transmitters/receivers 25, 26, 27, 28, possibly serving as a communication sub-network head end, a CMA software module 32 tasked with the initialization, the maintenance and the cutting-off of a link, an IDRP software module 33 tasked more specifically with the routing, an "ATC Applis" software module 34 tasked with running the tasks relating to air-traffic control, and "non-ATC Applis" software modules 35 tasked with running the tasks relating to the management of the flight and the aircraft.

These various software modules will not be detailed, since they do not form part of the invention. They are designed by specialists in software engineering, having regard simultaneously to the specific requirements of the equipment installed on board the aircraft, to the standardized protocols of the ATN network and to the features desired by the air-traffic control authorities and by the company operating the aircraft.

At the present time, once one of the "non-ATC Applis" software modules 35 has determined the necessity for a link with the ground by way of the ATN network, it calls directly upon the ATN communication stack for the setting up of the link. The message is then relayed gradually within the network up to the requested remote terminal. The success of the logon attempt depends on the availability on the remote terminal of the application with which a contact is sought. If the application is available, the message is delivered to it, if it is not, the logon attempt is a failure. In either case, the resources of the ATN network are invoked, thereby involving systematic use of the transmission capabilities of the ATN network and a billing of a flat-rate logon charge independently of the subsequent success or failure of the logon attempt.

When a logon attempt fails, the application which is the cause thereof generally repeats it a certain number of times, before giving up. This may lead, especially when an application periodically calls upon the same counterpart by way of the ATN network, to unwarranted tying up of the capabilities of the ATN network and to appreciable extra expense for the proprietor of the application, related to this fruitless use of the ATN network.

To limit the fruitless requests for logon through the intermediary of the ATN network, a calls validation procedure is introduced, executed with each message transmission attempt on the part of one of the "non-ATC Applis" modules so as to eliminate calls doomed to certain failure. This call validation procedure can be conducted by a call validation software module 36 added to the other software modules of the router.

For this validation, the call validation software module 36 relies on two tables of availability of applications specific to the relevant router and stored in its ATN database 23, a local availability table cataloging the applications available locally and a remote availability table cataloging the applications available at the level of the terminals for linking to the ATN network, of one or more privileged counterparts picked, either because they have been preselected, or because there has already been a recent attempt to logon to them through the ATN network.

The local availability table which catalogs the addresses of the applications available locally does not serve directly for the call validation software module of the relevant router but allows the routers of the terminals for linking to the ATN network of the remote counterparts to feed their remote availability tables with information relating to the applications actually accessible at the level of the relevant router. The addresses which it holds are advantageously accompanied by a date of update advising as to the freshness of the information.

The remote availability table catalogs addresses of applications regarded as actually accessible at the level of remote terminals for linking to the ATN network with, either a date of input into the table or the date of update which accompanies them upon their extraction from a local availability table. It is consulted by the call validation software module 36 with each logon request on the part of a "non-ATC" application.

The call validation software module 36 consults the remote availability table so as to search the latter for the actual presence of the address of the remote application called. If it finds this address in the remote availability table and should it be accompanied by a sufficiently recent date of update or of utilization, it validates it and the call continues on its course. In the converse case, it discards it and blocks the call before any attempt to logon to the ATN network.

The flowchart of FIG. 3 illustrates the main steps of this validation process.

At 40, the call validation software module 36 executes a waiting loop in the absence of any logon request on the part of an on-board non-ATC Appli. As soon as it detects a logon request, the validation software module leaves its waiting loop and tests at 41 the presence in the remote availability table of the remote application address contained in the logon request. If the search is abortive, the module invalidates the logon request. If this search is fruitful, it goes to a second test 42 regarding the date of update associated with this address in the remote availability table. If the date of update is too old, the module invalidates the logon request. In the converse case, it validates it. In all cases of rejection of logon request, the call validation software module 36 can emit an erroneous address alarm.

The updating of the availability tables is also a task carried out by the call validation software module 36, with the aim of making sure of the validity of the information contained in its local and remote availability tables. This call validation module 36 comprises an update application capable of interrogating the local availability tables of remote terminals and of responding to the requests by remote terminals to consult the local availability table.

The updating of the local availability table is carried out by receiving nonavailability alarms as well as notices of end of nonavailability of the local applications, and by their transfer to the local availability table. The update application can also carry out, on its own initiative, periodic checks of availability of the local applications and transfer their results to the local availability table.

Should there be alterations to these availabilities, the availability tables update application communicates these information changes which have appeared in the local availability table which it manages to the remote terminals of the counterparts cataloged in the remote availability table of the relevant router.

Moreover, the task of updating the remote availability table is carried out by periodic checking of the dates of validity of information contained in the remote availability table. As soon as one of these items of information reaches an arbitrarily fixed expiry date, the availability tables update application gets in touch with its fellow application in the remote terminals involved so as to obtain from them, in return, the information contained in their local availability tables.

Once it is in communication with its fellow of the remote terminal, the local application for updating the availability tables can send two kinds of inquiries to its fellow:
  a general inquiry containing a copy of its local availability table, if the identifier of the relevant remote terminal does not appear in the remote availability table or
  a particular inquiry containing the update of just the recent changes to its local availability table.

The advisories contained in the notification of the requester are entered by an availability tables update application which receives one of these inquiries by way of the ATN network into its remote availability table, together with a date of update or of entry. In return, it responds thereto by supplying the same advisories as those received from the requester.

Thus, the exchanging of these inquiries between these two entities allows them to synchronize with one another and to update their respective remote availability tables, as a function of the information contained in the local availability tables of their fellow.

A certain number of update requests remain unsatisfied by the local application for updating the availability tables through the fact that no link has been successfully set up trough the ATN network, with the fellow application of the relevant remote terminal. These unsatisfied update requests are consigned to a register by the local application for updating the availability tables. Once several specific requests for logon have failed, the remote terminal involved is regarded as out of service and all the calls which are destined for it are rejected for a certain period of time.

The call addresses are more strictly checked since they are systematically denied when they do not feature in the remote availability table. On the other hand, keeping the remote availability table up to date for the updating of the information which has expired requires more requests for logon through the ATN network since it is performed independently of the links set up.

Various alternatives may be envisioned without departing from the scope of the invention.

Thus, the local availability table can be preserved between two switchings-on of the linking terminal to which it belongs or be reinitialized each time this linking terminal is switched on.

The remote availability table can be reinitialized upon switching on the relevant terminal, with a default content which reflects the theoretical availabilities of non-ATC remote applications of previously listed remote terminals and which is updated by interrogating the remote terminals utilized regarding the differences between the actual and theoretical contents of their local availability tables.

The remote availability table can be erased when switching on the relevant terminal and updated progressively, by harnessing logon requests originating from local or remote non-ATC applications to interrogate the terminals which greet them as to the contents of their local availability tables.

The remote availability table can be reinitialized upon switching on the relevant terminal, by remote copying of the contents of the local availability tables of a preset list of remote terminals and updating by periodically interrogating the remote terminals as to the contents of their local availability tables.

What is claimed is:

1. A system for selecting applications which can be activated through an aeronautical telecommunication network and for providing a local terminal with the ability to link to the aeronautical telecommunication network and be a party to communications using non-air traffic control (non-ATC) applications, comprising:
  a first table configured to catalog the non-ATC applications available at the local terminal;
  a second table configured to catalog the non-ATC applications available at one or more preselected remote terminals, or at one or more remote terminal for which communication has previously been established through the aeronautical telecommunication network;
  first means for consulting the first table, the first means for consulting being activated by a request for communications by a local terminal;
  second means for consulting the second table, the second means for consulting being activated with each attempt made by the non-ATC application of the local terminal to logon through the aeronautical telecommunication network, wherein the second means for consulting either authorizes logon if the remote terminal requested is cataloged in the second table for the relevant non-ATC application, or denies logon if the remote terminal is not listed in the second table for the relevant non-ATC application;
  means for remotely interrogating a third table corresponding to the remote terminal that is to be contacted through the aeronautical telecommunication network;
  means for updating the first table by monitoring the availability of the non-ATC applications possessed by the local terminal, and
  means for updating the second table by at least partially copying the third table corresponding to the remote terminal that is to be contacted using the means for remotely interrogating the third table.

2. The system as claimed in claim 1, further comprising: means for reinitializing the first table upon switching on a relevant local terminal.

3. The system as claimed in claim 1, wherein: the means for updating the first table provides said updating as a function of nonavailability alarms and nonavailability notices generated by non-ATC applications.

4. The system as claimed in claim 1, wherein: the means for updating the first table provides the updating in a systematic and periodic manner.

5. The system as claimed in claim 1, further comprising: means for initializing the second table upon switching on a relevant local terminal with a content obtained by copying contents of availability tables of previously listed remote terminals for linking to the aeronautical telecommunication network.

6. The system as claimed in claim 1, further comprising: means for initializing the second table upon switching on a relevant local terminal with a default content which reflects the theoretical availabilities of non-ATC remote applications of a previously listed remote terminal and which is updated by interrogating the remote terminal for differences between the actual and theoretical contents of availability tables corresponding to the remote terminal.

7. The system as claimed in claim 1, wherein:
the first means for consulting the first table is sensitive to at least two types of inquiries from a remote terminal, a general inquiry regarding the global content of the third table of the remote terminal and a particular inquiry regarding the differences between the actual and theoretical contents of the third table corresponding to the remote terminal and the second table.

8. The system as claimed in claim 1, further comprising:
means for initializing the second table upon switching on a relevant local terminal, and remotely copying contents of third tables of a preset list of remote terminals and the second table is updated by periodically interrogating the remote terminals of the preset list to determine the contents of the third tables corresponding to the remote terminals of the preset list.

9. The system as claimed in claim 1, wherein:
the local terminal includes means for determining a change of state of availability of one of the non-ATC applications therein and warns all the remote terminals referenced in the first table of this change of state of availability to harmonize the second table and the third table.

10. The system as claimed in claim 1, wherein:
the local terminal for linking to the aeronautical telecommunication network includes a microprocessor-based automaton catering for the management of the communications under the control of various specialized software modules called as a function of the nature of the task to be performed, the software modules on call comprising,
a CMA software module configured to initialize maintain and complete a communications application,
an SN-SME software module configured to maintain and complete logon within the aeronautical telecommunication network,
an IRDP software module configured to route communications;
ATC Applis software module configured to execute a preloaded ATC applications; and
non-ATC Applis software modules configured to execute non-ATC applications, wherein
the second means for consulting the second table, the means for updating the first table, and the means for updating the second table include said microprocessor-based automaton operating under the control of a specific software module for validating calls, which intercepts requests for logon of non-ATC local applications and verifies availability of a remote terminal before authorizing logon.

11. The system as claimed in claim 1, wherein:
the means for updating the first table includes a software module for validating calls that monitors the status of information contained in the first and second tables and updates the first and second tables at a fixed expiry date.

* * * * *